United States Patent [19]

Pioch et al.

[11] 4,194,345

[45] Mar. 25, 1980

[54] LAWNMOWER

[75] Inventors: Peter P. Pioch, Idstein; Rainer Bachmann, Hohenstein, both of Fed. Rep. of Germany

[73] Assignee: Black & Decker Inc., Newark, Del.

[21] Appl. No.: 915,627

[22] Filed: Jun. 14, 1978

[30] Foreign Application Priority Data

Jun. 16, 1977 [DE] Fed. Rep. of Germany ....... 2727157

[51] Int. Cl.$^2$ .......................................... A01D 35/20
[52] U.S. Cl. .................................. 56/17.5; 56/320.2
[58] Field of Search ................... 56/12.7, 17.5, 320.1, 56/320.2

[56] References Cited

U.S. PATENT DOCUMENTS

| 3,299,622 | 1/1967 | Hanson et al. ........................ 56/17.5 |
| 3,413,783 | 12/1968 | Gordon ................................. 56/320.2 |
| 3,485,018 | 12/1969 | Beckering et al. ................... 56/320.2 |
| 3,574,272 | 4/1971 | Krewson .............................. 56/320.2 |
| 3,807,151 | 4/1974 | Rosenthal ............................ 56/320.1 |
| 4,064,680 | 12/1977 | Fleigle ................................. 56/320.2 |

FOREIGN PATENT DOCUMENTS

| 1944645 | 5/1971 | Fed. Rep. of Germany ............ 56/17.5 |
| 2006643 | 8/1971 | Fed. Rep. of Germany ............ 56/17.5 |
| 2346461 | 7/1975 | Fed. Rep. of Germany ............ 56/17.5 |
| 2519842 | 11/1976 | Fed. Rep. of Germany .......... 56/320.1 |
| 1532725 | 6/1968 | France ..................................... 56/17.5 |
| 1448945 | 9/1976 | United Kingdom .................... 56/320.2 |

Primary Examiner—Russell R. Kinsey
Assistant Examiner—Paul J. Hirsch
Attorney, Agent, or Firm—Walter Ottesen; Leonard Bloom; Edward D. Murphy

[57] ABSTRACT

A rotary lawnmower includes a dish-like body defining the chassis of the lawnmower. The dish-like body has an upwardly extending side wall and a substantially continuous bottom wall. A set of wheels are mounted on this dish-like body. A motor is mounted in the body so as to cause the free end of the motor drive shaft to penetrate the bottom wall. The free end of the motor drive shaft is adapted for carrying a cutting blade thereon. A cover interfaces with the dish-like body to conjointly define therewith a housing enclosing the motor.

22 Claims, 6 Drawing Figures

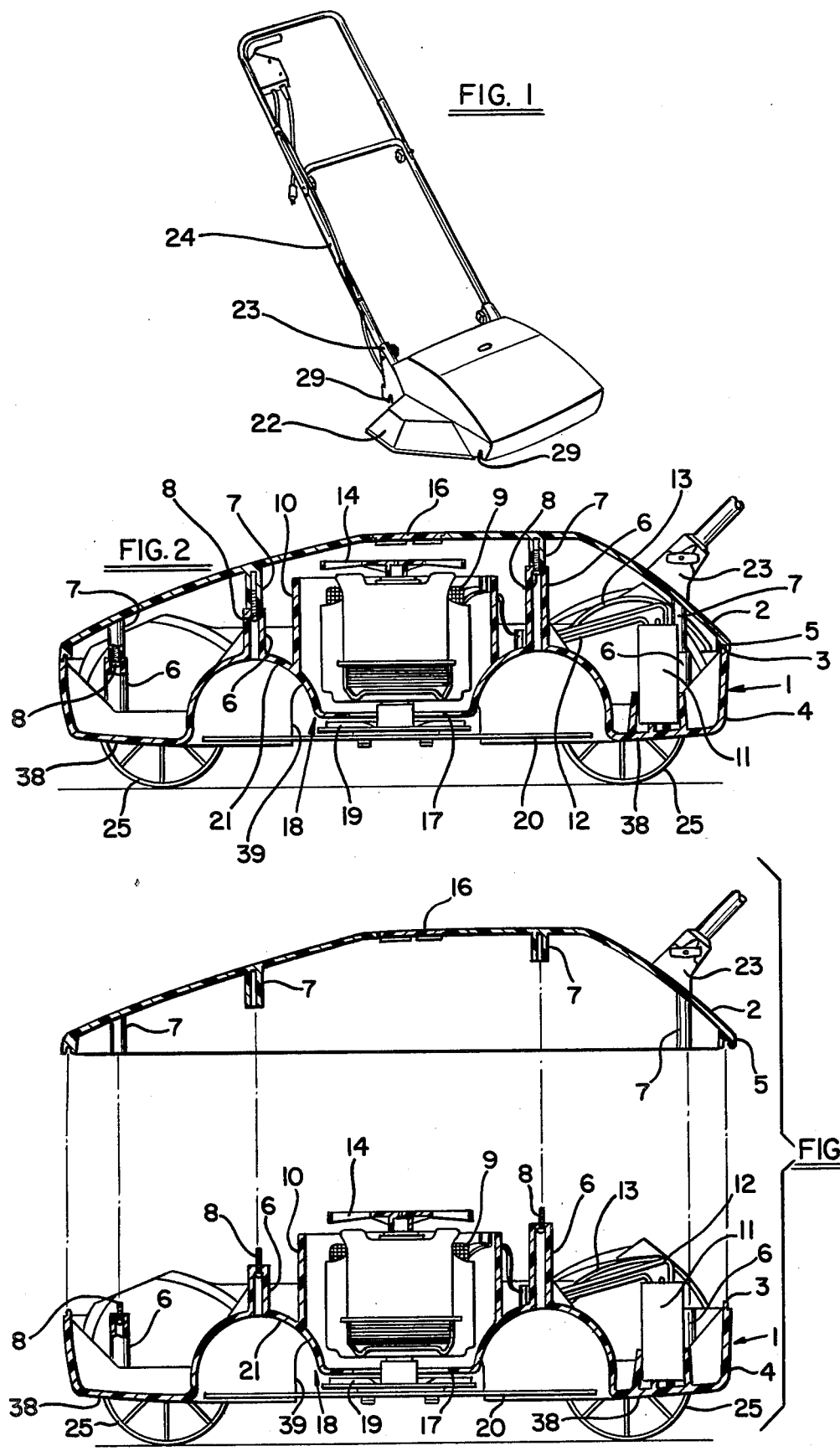

LAWNMOWER

BACKGROUND OF THE INVENTION

The invention is directed to a rotary lawnmower having a two part housing enclosing and carrying the drive motor. The drive motor has an output shaft adapted for carrying the cutting knife. The wheels of the lawnmower are mounted on the lower part of the housing as are means for mounting a handle.

In the conventional rotary lawnmower, the motor is mounted on a lower housing equipped with a peripheral wall facing downwardly to define an enclosed space wherein the cutting knife is mounted. In addition, conducting surfaces directed downwardly from the upper surface of the lower housing body are provided to conduct the grass clippings and the air stream generated by the rotation of the cutting knife to the grass outlet port in the desired manner. The motor is covered by an upper housing part which constitutes the motor hood. The upper housing part is then secured to the upper surface of the lower housing part. In addition, the wheels are mounted to the lower housing part outside of the downwardly extending peripheral wall thereof. The lower housing part also carries means for securing the lawnmower handle.

The conventional rotary lawnmower also has uneven surface contour in the space defined by the lower part of the housing and surrounding the cutting knife. The uneven surface contour often includes angled conducting paths on which grass clippings can become lodged making it very difficult to clean.

The wheels of the conventional lawnmower are often disposed laterally outside of the lower housing part so that the wheels will not become blocked by grass clippings as is the case when the wheels are disposed in the cutting region. However, with the wheels mounted outside of the lower housing part, it is not possible to come close to objects such as walls or trees during the grass cutting operation. In such a situation it is necessary to perform a trimming operation which is usually done manually. Further, the wheels can become jammed in bushes and branches.

SUMMARY OF THE INVENTION

In view of the foregoing, it is an object of the invention to provide a rotary lawnmower which has a relatively low profile and which has smooth, easy to clean surfaces especially in the cutting region.

The foregoing object is achieved with the lawnmower according to the invention by providing a dish-like body defining the chassis of the lawnmower and having an upwardly extending side wall and a substantially continuous bottom wall. A motor equipped with an output drive shaft has a free end and is mounted in the dish-like body so as to cause the free end of the drive shaft to penetrate the bottom wall for carrying a cutting blade thereon. A cover interfaces with the dish-like body to conjointly define therewith a housing enclosing the motor.

According to another feature of the invention, the cover can be of a dome-like configuration having a lower edge conjointly defining an interface line with the upper edge of the side wall of the dish-like body.

Thus, the housing of the motor is made up of two parts of which the lower part is configured as a deep dish opening in the upward direction and the upper part is also dish-like or dome-like and opens in a downward direction. These two parts conjointly define the space for receiving the motor. Because of this configuration, the drive shaft of the motor can be relatively short since it must only penetrate the bottom wall of the dish-like body. It is necessary for the bottom wall to be above the cutting plane of the cutting knife only a small distance at the region of the bottom wall where the shaft penetrates the latter.

In addition, the bottom wall surface can be formed so as to be relatively smooth so that it is easy to clean. The dome-like cover serves primarily for covering the total inner region of the dish-like body and increases the stability of the entire housing because of its connection with the lower dish-like body.

In order to achieve a form for the bottom wall surface which facilitates the flow of the grass clippings and the air currents generated by the cutting knife, an upwardly curved recessed passage is formed in the bottom wall in the region of the cutting knife. The passage is of annular or spiral configuration and is disposed in concentric relationship to the motor drive shaft. This passage can be in the form of the upper half of a toroid.

This kind of configuration of the bottom surface is also known in conventional lawnmowers; however, the arcuate passage in such lawnmowers is formed in a massive base plate having no upwardly extending peripheral wall and the housing is not made up of two interfacing dish-like parts. In the conventional lawnmower, the drive motor is simply mounted atop the base plate and the upper part of the motor is covered by a small motor hood.

In contrast thereto, the chassis of the lawnmower according to the invention forms also a part of the housing of the motor and both the dish-like body defining this chassis and the dome-like cover are preferably made of synthetic material. These parts can be made without difficulty by an injection molding process.

In order to achieve for the lawnmower according to the invention the capability of cutting close to walls and trees while at the same time preventing blockage of the wheels through bushes and branches, the lower dish-like body has chambers formed therein which open downwardly for receiving therein the wheels so that the wheels are within the lower housing body.

Preferably, the cover is configured so that it has wall portions which extend downwardly toward the interface line between the cover and the lower dish-like body. In this way, the side wall of the lower dish-like body does not have to extend upwardly all the way up to an elevation corresponding to the upper end of the drive motor whereat a ventilating fan is mounted.

It is also an object of the invention to provide a lawnmower which provides improved noise attenuation.

This is achieved according to still another feature of the invention wherein an upwardly extending annular wall is provided within the housing conjointly defined by the dish-like body and the cover. The annular wall is arranged in surrounding relation to the motor and is preferably formed in one piece with the dish-like body. The annular wall supplements the noise attenuation achieved by the enclosed housing defined by the dish-like body and cover.

The above objects and advantages of the invention will become more apparent from a consideration of the detailed description to follow taken in conjunction with the drawing annexed hereto.

BRIEF DESCRIPTION OF THE DRAWING

FIG. 1 is a perspective view of the lawnmower according to the invention;

FIG. 2 is an elevation view, partially in section, of the lawnmower according to the invention;

FIG. 3 is an elevation view of the lawnmower with the cover shown separated from the lower, dish-like body;

DESCRIPTION OF THE PREFERRED EMBODIMENTS OF THE INVENTION

Figure 4:
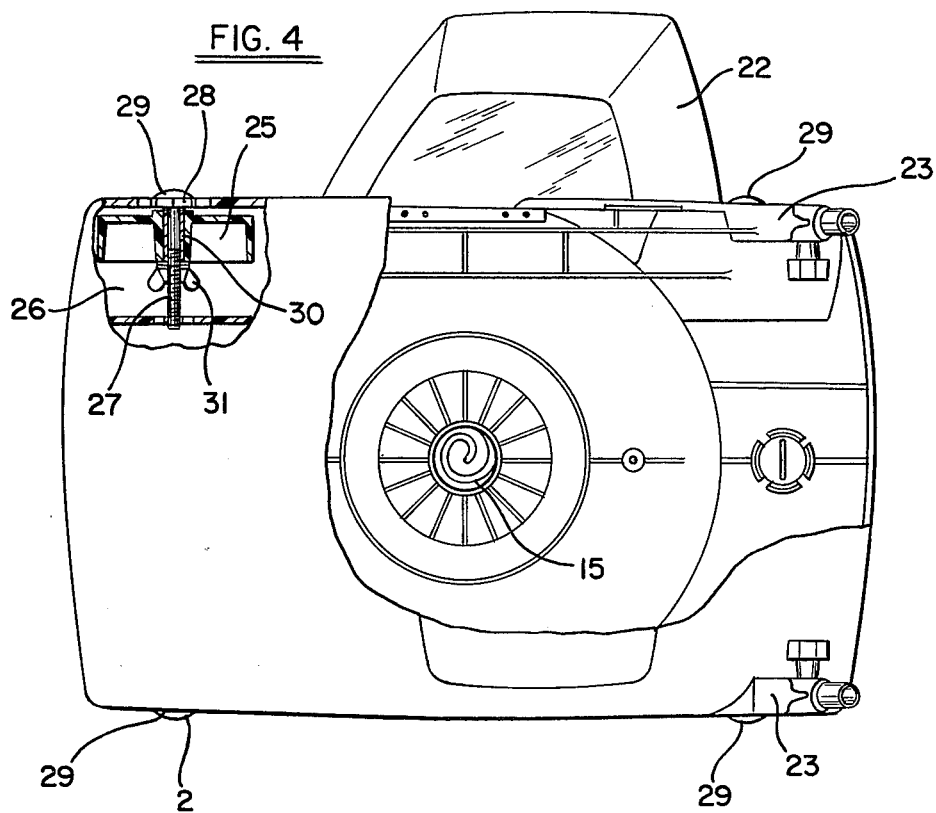
FIG. 4 is a plan view of the lawnmower of FIG. 1 with two breakout portions showing the motor and wheel mounting arrangement, respectively.

Referring now to FIGS. 1 and 2, the housing of the lawnmower includes a dish-like body 1 and a dome-like cover 2. The cover 2 and dish-like body 1 are joined to each other along an interface line 3. The side wall 4 of the dish-like body is directed upwardly and the cover 2 has edges 5 which can be configured so as to overlap to a degree the upwardly extending side wall 4 of the dish-like body 1. The dish-like body 1 is provided with projections 6 which extend upwardly and the cover is provided with corresponding projections 7 extending in the downward direction. By means of corresponding pairs of these projections, the cover 2 and dish-like body 1 can be secured to each other with the aid of screws 8.

Referring to FIGS. 2, 3 and 4, an electric motor 9 is mounted in the dish-like body 1. The motor 9 is surrounded laterally by an upwardly extending annular wall 10 formed as an integral part of the dish-like body 1. The wall 10 is, in turn, surrounded by the upwardly extending side wall 4 of the dish-like body 1. This configuration achieves excellent cooling and improves noise attenuation. The motor is connected with a capacitor 11 by means of leads 12 on the one hand and with a connecting cable 13 for the power supply on the other hand.

Referring to FIG. 2, a ventilator 14 is mounted at the upper end of the motor shaft and is provided with a marking 15 (FIG. 4) so that rotation of the motor will be indicated during operation and even after the motor is disconnected. The marking is viewed through a window 16 in the upper part of the cover 2.

The lower free end of the motor shaft penetrates the opening 17 in the bottom wall 18 of the dish-like body 1 and carries a ventilator 19 as well as a cutting knife 20.

As FIG. 2 illustrates, the dish-like body includes the bottom wall 18 which defines a substantially continuous bottom surface and which includes a surface region 21 defining a conducting path of arcuate section formed in concentric relationship to the opening 17. The surface region 21 of the bottom wall 18 corresponds to the upper half of a toroid and is curved upwardly as shown in FIG. 2. In this way, there is achieved a cutting space which facilitates the flow of air and grass clippings. The cutting space is defined by a smooth surface having no corners wherein grass clippings can collect and which is easy to clean. This semi-toroidal arcuate region leads to the grass discharge outlet 39. The grass outlet is covered from above with a hood 22.

The dish-like body 1 has receiving means 23 formed thereon for removably holding a handle 24 of the lawnmower.

The wheels 25 of the lawnmower are held in chambers 26 open in a downward direction. The chambers 26 are located within the dish-like body 1 at the lateral peripheral regions thereof and are substantially sealed off with respect to the space enclosed by the dish-like body 1 and the cover 2. These chambers 26 are formed in the dish-like body 1 and are made as one piece therewith.

Figure 6:
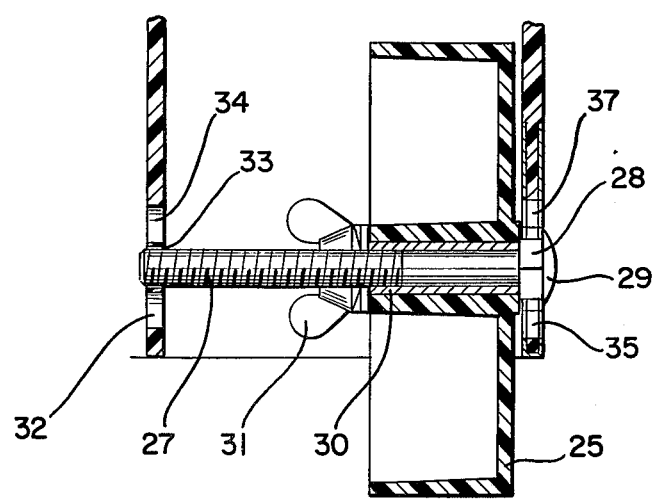

The wheels 25 are held with respective bolts 27 as shown in FIG. 6. The bolts 27 have a four-flat profile 28 when viewed from the threaded portion thereof. The four-flat profile 28 is directly adjacent the screwhead 29. A bearing bushing 30 is mounted on the threaded bolts 27 for accommodating the wheel 25 and is pressed against the four-flat profile 28 with the aid of a wing-nut 31. The bushing 30 extends outwardly beyond the inner edge of the wheel 25 so that the wing-nut 31 will not come into contact therewith thereby permitting free rotation of the wheel.

Figure 5:
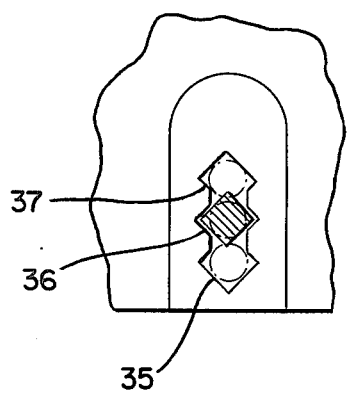
FIG. 5 is an elevation schematic diagram showing how the wheel can be positioned at three different elevations; and, FIG. 6 is a section view taken through one of the wheel compartments of the dish-like body of the housing.

The bolt 27 serves as the wheel axle and is mounted in one of the openings 32, 33 or 34 at the inner chamber wall on the one hand, and by means of one of three correspondingly aligned latching openings 35, 36 and 37 in the outer wall (FIG. 5) on the other hand. The openings 35, 36 and 37 in the outer wall are lozenge-shaped as shown in FIG. 5 and are formed so that the four-flat profile 28 can be securely received therein. In order to ensure that the four-flat profile 28 is secured in position with respect to the sides of the lozenge-shaped openings and to ensure that the wing-nut 31 will press the bolt head 29 against the outer surface of the chamber wall, the threaded bolt 27 is also held in the opening 33 (FIG. 6) so that a stationary axle is provided for the wheel 25.

In order to adjust the height of the wheel 25 with reference to the bottom surface of the bottom wall 18 of dish-like body 1, the wing-nut 31 is loosened so that the four-flat profile 28 can be pulled laterally out of the latching opening 36. In this way the free end of the threaded bolt 27 comes free of the opening 33. Should it be desired to reduce the distance of the bottom surface of the dish-like body 1 from the ground the threaded bolt is pulled from the outer chamber wall and moved upwardly to the opening 37 and is then pushed inwardly again so that the four-flat profile comes into engagement with the opening 37. At the same time, the free end of the threaded bolt 27 is guided into the opening 34 in the inner chamber wall. Then the wing-nut 31 is again tightened and the threaded bolt 27 again constitutes a stationary axle for the wheel 25.

As shown in FIG. 2, the bottom wall 18 of the dish-like body 1 includes a relatively flat region 38 which extends substantially into the cutting plane of the cutting knife 20. The space for the air flow and the removal of the grass clippings is achieved by annular recess means having surface 21 formed in the bottom wall 18 and located concentrically to the opening 17. The spacing between the cutting knife 20 and the lower end of the motor is substantially smaller than it is in conventional lawnmowers having a housing made up of two parts.

Further, the motor is completely surrounded by the dish-like body 1 and cover 2 as well as laterally by the annular wall so that a substantial attenuation of noise results.

It is apparent that the dish-like body 1 and cover 2 can be simply made by means of an injection molding process whereby, for example, the lower dish-like body is formed with projections 8 and the chambers 26 as well as the annular wall 10. In corresponding fashion, the dome-like cover 2 can likewise be formed to have the corresponding projections 7.

Although the drive motor disclosed in connection with the above description is an electric motor, it should be understood that other drive motors such as a gasoline engine could be utilized.

What is claimed is:

1. A rotary lawnmower having a rotary cutting blade defining a cutting plane comprising:
   a one-piece dish-like body defining the chassis of the lawnmower and having a substantially continuous bottom wall at least a portion of which is substantially in the plane defined by the cutting blade;
   said dish-like body further having a wall extending upwardly from said bottom wall to define the outermost peripheral sidewall of said body;
   said outermost peripheral side wall including an uppermost edge extending about the entire periphery of said body;
   a motor equipped with an output drive shaft having a free end, said motor being mounted in said body so as to cause said free end to penetrate said bottom wall for carrying the cutting blade thereon; and,
   a cover coextensive with said uppermost edge of said outermost peripheral side wall, said cover being engageable with said outermost side wall at said uppermost edge to conjointly define with said dish-like body a housing enclosing said motor.

2. The rotary lawnmower of claim 1 comprising: said cover being a dome-like member having a lower edge conjointly defining an interface line with the upper edge of said side wall.

3. The rotary lawnmower of claim 2 comprising: said dish-like body and said dome-like member both being made of synthetic material.

4. The rotary lawnmower of claim 2 comprising: said lower edge of said dome-like member being configured to overlap said upper edge of said dish-like body at least along a portion of said interface line.

5. The rotary lawnmower of claim 4 comprising: said dish-like body and said dome-like member both being made of synthetic material.

6. The rotary lawnmower of claim 5 comprising: said synthetic material being thermoplastic synthetic material.

7. The rotary lawnmower of claim 2 comprising: semi-toroid means formed in said body in surrounding relation to said free end of said drive shaft.

8. The rotary lawnmower of claim 7 comprising: an upwardly extending annular wall in said housing in surrounding relation to said motor.

9. The rotary lawnmower of claim 8 comprising: said annular wall being formed as an integral part of said dish-like body.

10. The rotary lawnmower of claim 1 comprising: an upwardly extending annular wall in said housing in surrounding relation to said motor.

11. The rotary lawnmower of claim 10 comprising: said annular wall being formed as an integral part of said dish-like body.

12. A rotary lawnmower comprising:
    a one-piece dish-like body defining the chassis of the lawnmower and having a substantially continuous bottom wall and having a wall extending upwardly from said bottom wall to define the outermost peripheral sidewall of said body, said outermost peripheral side wall including an uppermost edge extending about the periphery of said body;
    a set of wheels mounted on said body;
    a motor equipped with an output drive shaft having a free end, said motor being mounted in said body so as to cause said free end to penetrate said bottom wall for carrying a cutting knife defining a cutting plane;
    an inner annular wall formed in said dish-like body to extend upwardly from said bottom wall thereof in surrounding relation to said motor;
    annular recess means formed in said bottom wall in surrounding relation to said free end of said drive shaft to thereby define a passage above said cutting plane for conducting away the air stream and grass clippings caused by the cutting knife;
    said bottom wall including a relatively flat region extending laterally away from said recess means at an elevation substantially coplanar with said cutting plane; and,
    a cover coextensive with said uppermost edge of said outermost peripheral side wall, said cover engaging said dish-like body at said uppermost edge to conjointly define with said dish-like body a housing enclosing said motor and said inner annular wall surrounding said motor.

13. The rotary lawnmower of claim 12 comprising: said cover being a dome-like member having a lower edge conjointly defining an interface line with the upper edge of said side wall.

14. The rotary lawnmower of claim 13 comprising: said dish-like body and said dome-like member both being made of synthetic material.

15. The rotary lawnmower of claim 12 comprising: said lower edge of said dome-like member being configured to overlap said upper edge of said dish-like body at least along a portion of said interface line.

16. The rotary lawnmower of claim 15 comprising: said dish-like body and said dome-like member both being made of synthetic material.

17. The rotary lawnmower of claim 16 comprising: said synthetic material being thermoplastic synthetic material.

18. The rotary lawnmower of claim 12 comprising: semi-toroid means formed in said body in surrounding relation to said free end of said drive shaft.

19. The rotary lawnmower of claim 18 comprising: an upwardly extending annular wall formed in said body in surrounding relation to said motor.

20. The rotary lawnmower of claim 19 comprising: said annular wall being formed as an integral part of said dish-like body.

21. The rotary lawnmower of claim 12 comprising: an upwardly extending annular wall in said housing in surrounding relation to said motor.

22. The rotary lawnmower of claim 21 comprising: said annular wall being formed as an integral part of said dish-like body.

* * * * *